United States Patent [19]

Bernard et al.

[11] Patent Number: 4,583,404
[45] Date of Patent: Apr. 22, 1986

[54] ELECTROSTATIC ACCELEROMETER

[75] Inventors: Alain M. Bernard, Fresnes; Bernard Sacleux, Plessis Robinson, both of France

[73] Assignee: Office National d'Etudes et de Recherches Aerospatiales (O.N.E.R.A.), France

[21] Appl. No.: 584,405

[22] Filed: Feb. 28, 1984

[30] Foreign Application Priority Data

Feb. 28, 1983 [FR] France ................................. 83 03257

[51] Int. Cl.$^4$ ..................... G01P 15/125; G01P 3/44
[52] U.S. Cl. ................................................. 73/517 B
[58] Field of Search ................................... 73/517 B

[56] References Cited

U.S. PATENT DOCUMENTS

| | | | |
|---|---|---|---|
| 2,916,279 | 12/1959 | Stanton | 73/517 B |
| 3,080,761 | 3/1963 | Speen | 73/516 |
| 3,742,767 | 7/1973 | Bernard et al. | 73/517 B |
| 4,393,710 | 7/1983 | Bernard | 73/517 B |

FOREIGN PATENT DOCUMENTS 1137241 9/1962 Fed. Rep. of Germany .
2511509 2/1983 France .

*Primary Examiner*—Stewart J. Levy
*Assistant Examiner*—John E. Chapman, Jr.
*Attorney, Agent, or Firm*—Lowe, King, Price & Becker

[57] ABSTRACT

A tridimensional electrostatic accelerometer comprises a cube-shaped test weight. On each of the six faces of the cube is a pair of conducting electrodes. A hollow cage accommodates the test weight and twelve electrodes on the cage to form, with the test weight electrodes, three sets of four capacitors $C_{ij}$, where i varies from 1 to 4 and j is x, y and z respectively. Measurements are made for each value of j of the sums and differences of the capacities $$(C_1 - C_2)_j (C_3 - C_4)_j$$

$$(C_1 + C_2)_j (C_3 + C_4)_j$$

From these quantities voltages are derived for positioning the test weight. The voltages are applied selectively to the electrodes of the set of capacitors $C_{ij}$.

3 Claims, 9 Drawing Figures

ELECTROSTATIC ACCELEROMETER

BACKGROUND OF THE INVENTION

1. Field of the Invention

This invention concerns those accelerometers in which an acceleration measurement is deduced from a measurement of the forces required to hold a test weight still or bring it back to a position defined with respect to a body of the apparatus. The invention concerns more particularly those accelerometers wherein these forces are electrostatically produced.

In this case, a force generator employs a series of n electrodes $E_1, E_2, \ldots E_i, \ldots, E_n$ set out around the test weight and integral with the body of the accelerometer. The parameters are denoted as follows:

$V_0$: potential of the test weight, $V_i$: potential of the electrode $E_i$, $C_i$: capacity of the electrode $E_i$ with respect to the test weight, x, y, z: coordinates of the center of the test weight within a reference frame $\vec{x}, \vec{y}, \vec{z}$, associated with the body of the accelerometer, $\theta, \Psi, \Phi$: three angles defining the attitude of the test weight with respect to the reference frame $\vec{x}, \vec{y}, \vec{z}$.

For small angles $\theta, \Psi$ and $\Phi$ correspond to rotations respectively about the axes $\vec{x}, \vec{y}$ and $\vec{z}$.

$$\vec{\nabla}_{xyz}:$$

gradient operator in relation to the variables x, y, z;

$$\vec{\nabla}_{\theta\Psi\Phi}:$$

gradient operator in relation to the variables $\theta, \Psi, \Phi$.

If applied to the capacities $C_i$, these gradient operators give rise to the following in the reference frame $\vec{x}, \vec{y}, \vec{z}$:

$$\vec{\nabla}_{xyz}(C_i) = \begin{vmatrix} \frac{\partial C_i}{\partial x} \\ \frac{\partial C_i}{\partial y} \\ \frac{\partial C_i}{\partial z} \end{vmatrix} \text{ and } \vec{\nabla}_{\theta\Psi\Phi}(C_i) = \begin{vmatrix} \frac{\partial C_i}{\partial \theta} \\ \frac{\partial C_i}{\partial \Psi} \\ \frac{\partial C_i}{\partial \Phi} \end{vmatrix}$$

Using these notations, it can be shown that the electrostatic force F and couple exerted on the test weight may be expressed as follows in the reference frame $\vec{x}, \vec{y}, \vec{z}$:

$$\vec{F} = \frac{1}{2} \sum_{i=1}^{n} \vec{\nabla}_{xyz}(C_i)(V_i - V_0)^2$$

$$\vec{\mathcal{A}} = \frac{1}{2} \sum_{i=1}^{n} \vec{\nabla}_{\theta\Psi\Phi}(C_i)(V_i - V_0)^2$$

Only the value of the electrostatic force $\vec{F}$ has any bearing in how the accelerometer works, but to determine said force, in addition to the measurements of the potentials $V_i$, the values must be known of the gradients $$\vec{\nabla}_{xyz}(C_i)$$

and potential $V_0$ of the test weight.

2. Description of the Prior Art

The method of determining the gradient $$\vec{\nabla}_{xyz}(C_i)$$

on the one hand and zero cueing of the potential $V_0$ on the other hand has already been discussed in U.S. Pat. No. 4,393,710 issued July 19, 1983.

Accelerometers of the electrostatic type are already known through U.S. Pat. No. 3,742,767 issued July 3, 1973 and French Pat. No. FR-A-2511509 filed Dec. 31, 1980.

The accelerometer disclosed in the former patent is an ultrasensitive accelerometer using a spherical conductive ball floating in a spherical hollow cage as a test weight. The latter patent discloses a navigation accelerometer.

DE-B-1137241 filed Apr. 13, 1961 discloses an accelerometer having a cubic or spherical test weight, a pressure sensing or capacitive position detection system and a pressurized air position control system. With a view to developing an ultra-sensitive accelerometer, the electrostatic suspension of a spherical weight offers the advantage of requiring position slaving in three axes only (rotations are left free). Along each axis, differential capacitive measurements made by means of diametrically opposed electrodes ($E_1$ and $E_2$ in FIG. 1) determine the translation of the sphere and hence the acceleration to which the center of mass G thereof is subjected.

The use of spherical test weights has a further advantage. There is no need to provide the surface of a sphere with metal portions delimited from one another and forming one of the armatures of the position detection and position control capacitors. Those armatures are nothing other than those parts of the conducting ball which are opposite the armatures on the inner cage wall.

In the case of an ideal weight, shaped perfectly as a spheroid and having equal potential, the mechanical and electrical properties are isomorphic for any change of a reference frame centered at the cage center. Any rotation would therefore leave the capacities unchanged and likewise the potential differences between the electrodes and the test weight.

In practice, shortcomings in sphericity and fluctuations in potential of the test weight can adversely affect performance of the accelerometer when the surface parts of the floating weight, positioned opposite the electrodes, change with rotation.

Thus, by way of an example:

(a) rotation $\phi$ of the test weight (FIG. 1) about the axis $\vec{z}$ is likely to cause a variation in the difference $C_2 - C_1$ of the capacities in the absence of any change in position of the center of mass G of the sphere. Under these conditions, slaving in translation along the axis x recenters the test weight in such a way as to restore equality in the capacities $C_1$ and $C_2$. The acceleration imparted to the test weight for this recentering operation has a direct adverse effect on the measurement by producing low frequency noise (n times the frequency of rotation of the sphere for a sphericity defect of order n);

(b) if the slaving pass band is sufficiently large to ensure equality in the capacities $C_1$ and $C_2$ with negligible error, the simultaneous variations in these capacities correspond essentially to variation $\Delta e$ in the mean distance e between the electrodes and the sphere. As far as the accelerometer is concerned, this results in a relative sensitivity variation equal to $$2\frac{\Delta e}{e}.$$

Hence, for an ultra-sensitive accelerometer such as that discussed above (intended to measure solely accelerations less than $10^{-4}$ m/s²), the following values are obtained for a test weight 4 cm in diameter associated with 25 mm² electrodes:

$e \simeq 300$ μm $\Delta e \geq 0.1$ μm $$\frac{2\Delta e}{e} > 6.10^{-4}$$

For less sensitive accelerometers, the situation is worse since the dimension e must be reduced to obtain the necessary electrostatic forces with applied voltages of reasonable proportions (<300 volts);

(c) despite the care taken in fabricating the spherical test weight and the choice of conducting materials from which it is formed, the fluctuations in potential experienced at the surface of this sphere can reach several tens of millivolts. When the sphere turns, these fluctuations in potential are at the root of variations in the interactive electrostatic forces between the test weight and the conductors arranged thereabout (electrodes and cage).

A further difficulty experienced with a floating spherical test weight stems from variations in the geometry of the spaces between the electrodes and the sphere when the latter moves orthogonally to the sensitive axis that is theoretically the axis of the electrodes.

These variations in geometry give rise to non-linear coupling between the accelerometer axes: the application of voltages to the electrodes used for translationally slaving the sphere along the axis $\vec{y}$ (FIG. 2a) causes a parasite force along the axis $\vec{x}$ when the sphere is decentered under the effect of, for instance, an acceleration along $\vec{x}$ (FIG. 2b), even if the axes $\vec{x}$ and $\vec{y}$ are perfectly perpendicular. In the case of ultra-sensitive accelerometers, designed for spatial applications, the coefficients of sensitivity cannot be determined on the ground where such accelerometers are saturated by the acceleration due to gravity. It then becomes very difficult to determine and take account of these coupling effects.

All the sources of error educed above are particularly detrimental when the accelerators are intended for measuring the gradients of gravity, that is, accelerometers having ultra high sensitivity and accuracy as good as that required for navigation accelerometers.

In particular, linear accelerometers should be designed with very faithful sensitivity for carrying out differential measurement between accelerometers (measurement of gravity gradients in spatial orbit).

SUMMARY OF THE INVENTION

According to the invention, a tridimensional electrostatic accelerometer comprises a cube-shaped test weight having a pair of conducting electrodes on each of the six faces of said cube. Two electrodes are adjacent each other on each face. The electrodes on parallel faces of the cube are opposite from each other whereby each electrode on a face has an adjacent electrode on the same face, an opposite electrode on the parallel face and a diagonally opposite electrode on said parallel face and the electrodes form three sets of four electrodes. Each set of electrodes thus comprises a given electrode, an adjacent electrode, an opposite electrode and a diagonally opposite electrode and is respectively associated with a given one among three orthogonal coordinate axes. A hollow cage carrying twelve electrodes accomodates said test weight. The electrodes on the cage and the test weight electrodes form three sets of four capacitors $C_{ij}$, where i varies from 1 to 4 and j is x, y and z respectively associated with said orthogonal coordinate axes.

For each value of j a measurement is made of the quantities $(C_1 - C_2)(C_3 - C_4)_j$ $(C_1 + C_2)(C_3 + C_4)_j$ A signal indicative of each of these quantities is derived. From the measured quantities, there are derived the values:

$$V_{tr,j} = (C_1 + C_3)_j - (C_2 + C_4)_j$$

$$V_{rot,j} = (C_3 - C_4)_j - (C_1 - C_2)_j$$

Signals indicative of each of $V_{tr,j}$ and $V_{rot,j}$ are derived and combined to form a signal indicative of $-V_{tr,j} + V_{rot,j}$.

Voltages respectively proportional to $(-V_{tr,j} + V_{rot,j})$ and $(V_{tr,j} + V_{rot,j})$ are applied to opposite electrodes of an electrode set.

A voltage proportional to $V_{tr,j} + V_{rot,j}$ is applied to adjacent electrodes of said set, while a voltage proportional to $-V_{tr,j} - V_{rot,j}$ is applied to the diagonally opposite electrodes of said set.

BRIEF DESCRIPTION OF THE DRAWING

The invention will now be described in detail with reference to the appended drawings in which.

BEST MODE FOR CARRYING OUT THE INVENTION

Figure 1:
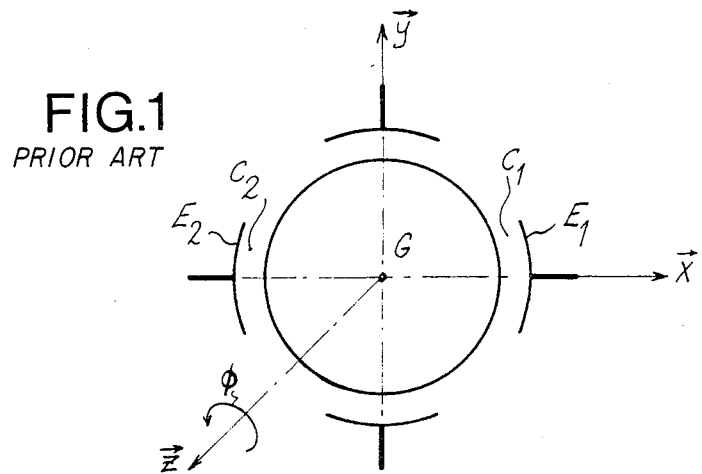
FIG. 1 is a schematic diagram of a prior art ball and its electrodes, as discussed in the foregoing.
Figure 2A:
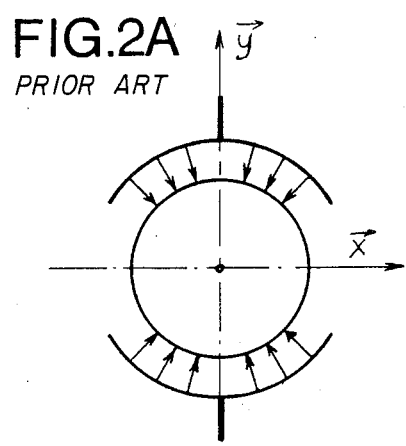
FIGS. 2a and 2b are drawings showing how the geometry and electric field lines of the prior art device are modified when the test weight is moved off center with respect to the electrodes, as discussed in the foregoing.
Figure 2B:
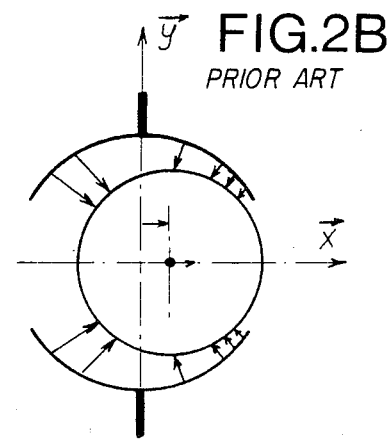
Figures 3A, 3B:
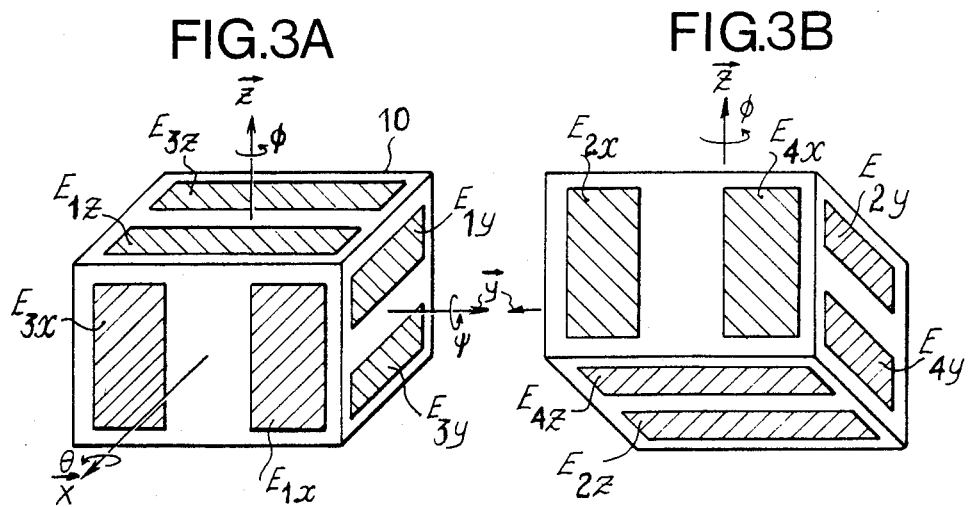
FIGS. 3a and 3b are drawings depicting the cubic test weight and the electrodes related to translational slaving along $\vec{x}, \vec{y}, \vec{z}$ and rotational slaving through $\Psi$, $\theta$ and $\Phi$.
Figure 4:
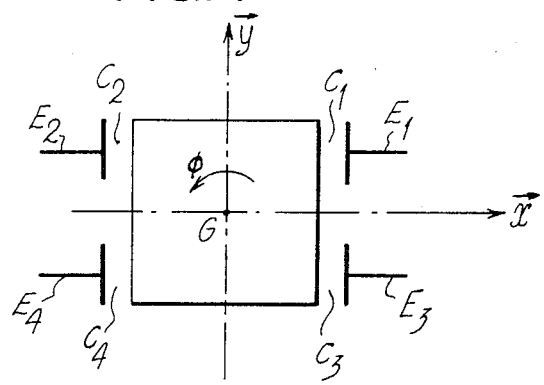
FIG. 4 is a diagram depicting more particularly the electrodes acting on x.

Test weight 10 which can pivot about three mutually orthogonal axes x, y, z is in the shape of a cube (FIGS. 3A and 3B). Two electrodes are respectively placed on opposite sides of each face of cube 10 such that:

electrodes $E_{1x}$ and $E_{3x}$ are on the front face perpendicular to Ox electrodes $E_{2x}$ and $E_{4x}$ are on the rear face perpendicular to Ox electrodes $E_{1y}$ and $E_{3y}$ are on the right face perpendicular to Oy electrodes $E_{2y}$ and $E_{4y}$ are on the left face perpendicular to Oy electrodes $E_{1z}$ and $E_{3z}$ are on the top face perpendicular to Oz electrodes $E_{2z}$ and $E_{4z}$ are on the bottom face perpendicular to Oz.

Figure 5:
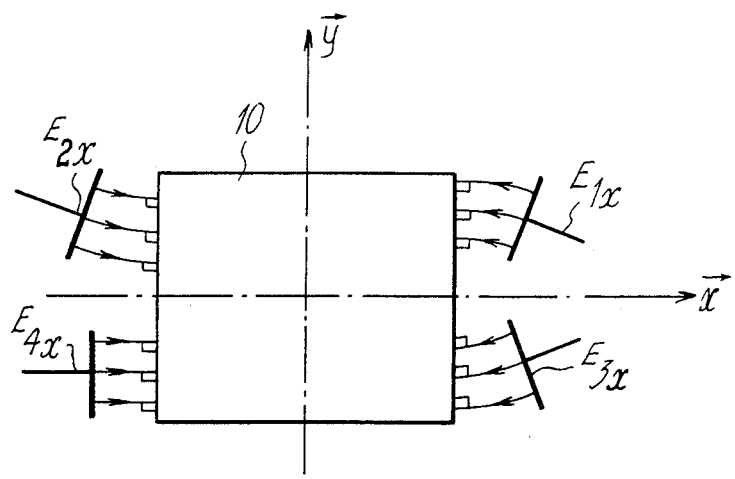
FIG. 5 is a diagram of the configuration of the electrical field lines in the presence of electrode positioning faults.

Further, even in the case where the electrodes are not exactly parallel to the faces of the cube, the directions orthogonal to the sides of the cube (directions of the field lines at the cube level) have privileged action and detection directions (FIG. 5).

As a result, whatever voltages are fed to the electrodes $E_{ix}$, the force exerted along axis $\vec{y}$ parallel to the electrodes $E_{ix}$ is zero. Likewise, if the cube moves translationally along the axis $\vec{y}$, the forces exerted along axis $\vec{x}$ are unchanged. These properties hold true even if the electrodes are imperfectly positioned (both regarding distance and orientation).

Figure 6:
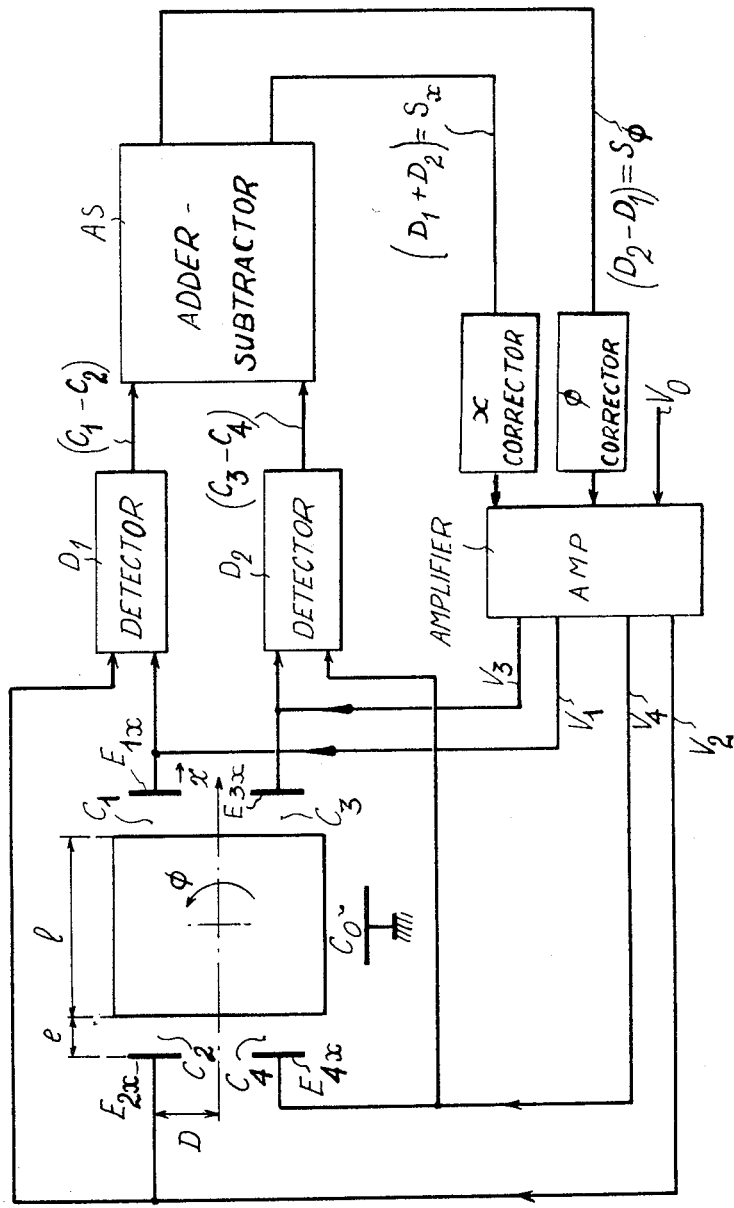
FIG. 6 is a diagram of circuitry for translationally and rotationally slaving via four electrodes that are used simultaneously for electrostatic position detection and positioning effects.

FIG. 6 is a diagram of circuitry for slaving in translation and rotation via the four electrodes that serve simultaneously for position detection and electrostatic positioning.

Capacitive detectors $D_1$ and $D_2$ derive voltages proportional to the differences in capacities $(C_1-C_2)$ and $(C_3-C_4)$. Considering the translation $\vec{x}$ and the rotation $\phi$ of test weight 11, and calling $\sigma$ the electrode surface area, e the distance from the test weight, 2D the distance between the centers of two electrodes on the same side of the cube, then to a first approximation, the following may be written:

$$\left. \begin{array}{l} C_1 - C_2 \simeq \dfrac{2\epsilon\sigma}{e^2}[x - D\Phi] \\ \\ C_3 - C_4 \simeq \dfrac{2\epsilon\sigma}{e^2}[x + D\Phi] \end{array} \right\} \quad (1)$$

where $\epsilon$ is the permittivity of vacuum.

From equations (1), it may be concluded that:

$$\left. \begin{array}{l} x \simeq \dfrac{e^2}{\epsilon\sigma}[(C_1 + C_3) - (C_2 + C_4)] \\ \\ \Phi \simeq \dfrac{e^2}{\epsilon\sigma D}[(C_3 - C_4) - (C_1 - C_2)] \end{array} \right\} \quad (2)$$

The operations deriving signals representing the values of x and $\phi$ are performed in an adder-subtractor AS that outputs the signals $S_x$ and $S_\phi$.

These signals $S_x$ and $S_\phi$ are fed respectively to the corrector circuits $COR_x$ and $COR_\phi$ that make it possible to produce slaving PID signals $V_x$ and $V_\phi$ (proportional to $S_x$ and $S_\phi$ and having further differential and integral components).

Lastly, an assembly of amplifier circuits AMP supplies the following electrostatic action signals:

$$V_1 = V_0 - V_x + V_\phi$$

that is fed to electrode $E_{1x}$ $$V_2 = V_0 + V_x - V_\phi$$

that is fed to electrode $E_{2x}$ $$V_3 = -V_0 + V_x + V_\phi$$

that is fed to electrode $E_{3x}$ $$V_4 = -V_0 - V_x - V_\phi$$

that is fed to electrode $E_{4x}$.

These electrostatic action signals can be alternating voltages with small angular frequency $\omega_A$ compared to angular frequency $\omega_D$ used for the detection voltages. In this instance, the action voltage applied to the electrode $E_i$ has the form:

$$V_i \sin \omega_A t$$

Since, as already stated, the electrodes $E_1$, $E_2$, $E_3$ and $E_4$ are used both for position detection and positioning action, an arrangement must be defined, whereby action voltages can be applied to these electrodes without disturbing the manner in which the capacitive detectors work.

Figure 7:
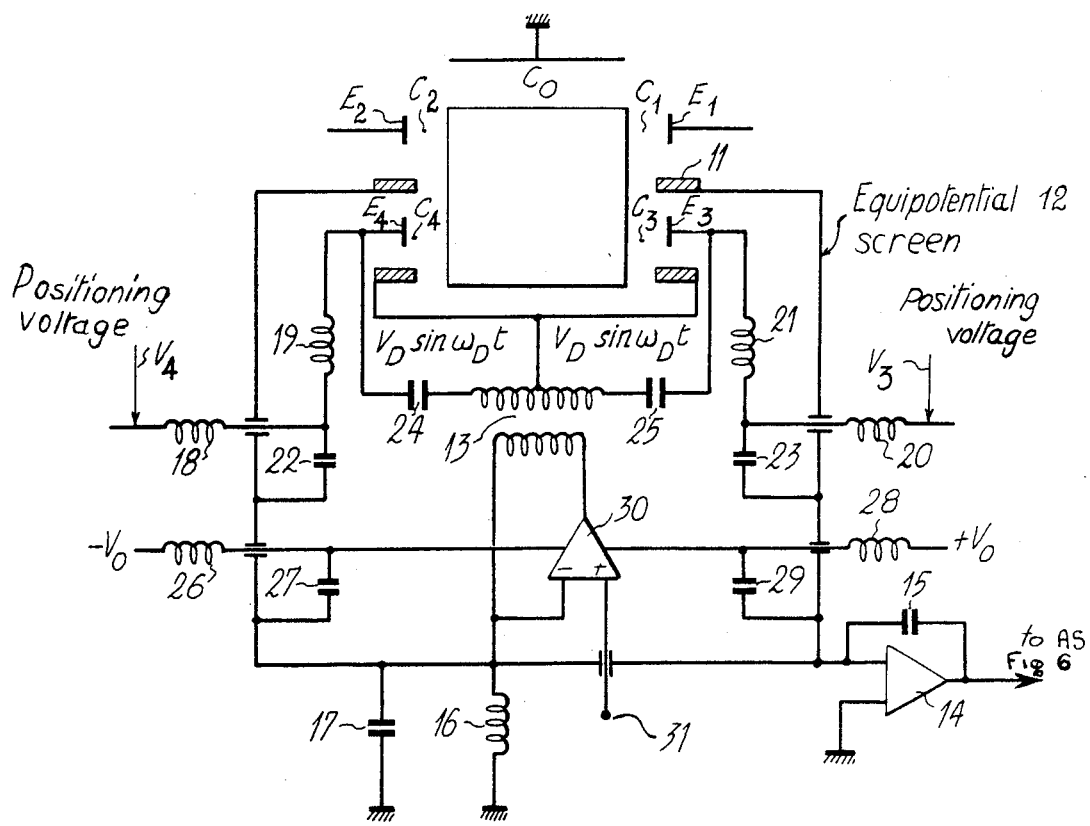
FIG. 7 is a circuit diagram for superposing detection signals and electrostatic action signals.

The arrangement adopted, depicted in FIG. 7, is very close to that described in U.S. Pat. No. 4,393,710.

Guard electrodes 11, coaxial with the active electrodes, such as $E_1$ and $E_3$, provide an equipotential screen 12 around said active electrodes, around differential transformer 13, and around amplifier 30 used for supplying the primary windings of transformer 13 with a signal of angular frequency $\omega_D$ selected for the detection voltages. Screen 12 is wired to the middle point of transformer 13 and to the input of an operational amplifier 14, including feed-back capacitor 15. This circuit makes it possible to bring the potential of screen 12 back to a value very close to that of the potential of the test weight.

Under direct current conditions, inductor 16 provides a link between the screen and the ground reference potential. At angular frequency $\omega_D$, inductor 16 is tuned by capacitor 17 so as to reduce further limited influence of the inductor on the measurement obtained at the output from amplifier 14.

Because the angular frequency $\omega_A$ of the action voltages $V_3$ and $V_4$ is small compared to $\omega_D$, filters made up of inductors 18, 19 and 20, 21 and capacitors 22, 23 and 24, 25, decouple the action and detection signals.

Likewise filters including inductors 26 and 28 and capacitors 27 and 29 introduce the dc supply voltages for amplifier 30 in screen 12 without damping the same.

In a known fashion, the capacitive detectors make use of synchronous detection; the synchronization for the synchronous detection and the oscillator feeding the differential transformer are advantageously obtained through equipotential screen 12 by an opto-electronic link 31.

Orders of magnitude:
Test weight:
  cube with 3 cm long sides
  weight ranging between 0.1 and 0.5 kg
Electrode E:
  surface area approximately 1 cm$^2$
Distance e between electrodes and test weight
  e≅100 μm
Voltage fed to the electrodes:

| effective action voltages: $V_0 \simeq 20V$ | frequency $\omega_A <$ 6.10$^3$ rd/s |
|---|---|
| $V_{translation} < 15V$ | |
| $V_{rotation} < 5V$ | |
| effective detection voltage: $V_D \simeq 10V$ | frequency $\omega_D \simeq$ 2.10$^6$ rd/s |

Measurement range:
  max. acceleration measured: on the order of a few $10^{-4}$ m/s$^2$
Natural accelerometer angular frequency:
  $\omega_N \simeq 10$ rd/s
  bias: less than one thousandth of the measurement range, i.e. a few $10^{-8}$ m/s$^2$
  resolution: on the order of $10^{-6}$ times or measurement range, i.e. $10^{-10}$ m/s$^2$ In the detailed description just presented, the test weight is a hollow or solid cube. The test weight, however, must merely carry on its outer surface six planar surfaces. Opposite pairs of the planar surfaces must be parallel to each other and be in face to face relation with the electrodes of the cage. Other shapes are possible (e.g. rectangular parallelepipeds, spheres with planar facets) providing they carry three pairs of planar, parallel and opposite sides, situated in three orthogonal directions to eschew certain coupling effects.

The test weight 10 is made of a conducting material (metal, alloy, . . . ) or a non-conducting material (e.g. silica) and coated with a metal deposit (e.g. gold). It can be hollow, solid or locally recessed.

What we claim is:

1. A tridimensional electrostatic accelerometer comprising:
   a cube-shaped test weight having six faces;
   a pair of conducting electrodes on each of the six faces of said cube-shaped test weight, two of said electrodes being adjacent on each face and the electrodes on two parallel faces of the cube being opposite two by two, whereby each first electrode on a face has an adjacent second electrode on the same face, an opposite third electrode on the parallel face and a diagonally opposite fourth electrode on said parallel face, the electrodes thereby forming three sets of four electrodes, each set comprising one of said first electrodes, one of said adjacent second electrodes, one of said opposite third electrodes and one of said diagonally opposite fourth electrodes, each of said sets being respectively associated with a given one among three orthogonal coordinate axes;
   a hollow cage accomodating said test weight;
   twelve electrodes on said cage, forming with the test weight electrodes three sets of four capacitors $C_{ij}$, where i varies from 1 to 4 and j is selectively each x, y and z, respectively associated with said orthogonal coordinate axes;

means for measuring for each value of j the quantities $(C_1-C_2)_j(C_3-C_4)_j$ $(C_1+C_2)_j(C_3+C_4)_j$;

means for forming with said above quantities signals indicative of:

$V_{tr,j}=(C_1+C_3)_j-(C_2+C_4)_j$ $V_{rot,j}=(C_3-C_4)_j-(C_1-C_2)_j$;

means responsive to the signals representing $V_{tr,j}$ and $V_{rot,j}$ for:
   applying a voltage proportional to $-V_{tr,j}+V_{rot,j}$ across the capacitor including said first electrode of an electrode set,
   and applying a voltage proportional to $V_{tr,j}-V_{rot,j}$ across the capacitor including said third opposite electrode of said set,
   and applying a voltage proportional to $V_{tr,j}+V_{rot,j}$ across the capacitor including said second adjacent opposite electrode of said set,
   and applying a voltage proportional to $-(V_{tr,j}+V_{rot,j})$ across the capacitor including said fourth diagonally opposite electrode of said set.

2. A three dimensional electrostatic accelerometer comprising:
   a test weight shaped as a parallelpiped having first, second and third sets of faces, a pair of parallel faces being included in each set, the faces of said first, second and third sets being mutually orthogonal, each set of faces being at right angles to separate mutually orthogonal axes x, y and z of the test weight,
   a first pair of electrodes on each face whereby there are first, second and third sets of said first pair of electrodes and a total of twelve separate electrodes on the test weight, the electrodes on each face being on opposite sides of the axis intersecting the particular face;
   first, second and third sets of fixed second electrodes, each set of second electrodes including two further pairs of electrodes, the first, second and third sets of second electrodes being mutually orthogonal along said x, y and z axes, the first, second and third sets of second electrodes being nominally parallel to and aligned with corresponding electrodes of the first, second, and third sets of first electrodes, respectively, whereby a separate capacitor is formed between each of the corresponding electrodes and twelve separate capacitors are thereby formed by the electrodes with four capacitors $C_i$ being provided for each of axes x, y and z, where i is selectively each of 1 to 4, capacitors $C_1$, $C_2$, $C_3$ and $C_4$ of each of axes x, y and z respectively including first, second, third and fourth electrodes of the first set, the first and second electrodes of each axis j being positioned on the same one of said faces perpendicular to axis j, where j is selectively each of axes x, y and z, the third and fourth electrodes of said axis j being positioned on the other one of said faces perpendicular to said axis j, the first and third electrodes of axis j being on the same one side of said axis j, the second and fourth electrodes of axis j being on the same other side of said axis j;

means responsive to the capacitances $C_1$, $C_2$, $C_3$ and $C_4$ for each of said axes j for deriving signals representing:

$$V_{tr,j} = (C_1+C_3)_j - (C_2+C_4)_j$$

$$V_{rot,j} = (C_3-C_4)_j - (C_1-C_2)_j;$$

means responsive to the signals representing $V_{tr,j}$ and $V_{rot,j}$ for:

(a) applying a voltage proportional to $-V_{tr,j}+V_{rot,j}$ across capacitor $C_1$ of axis j,
(b) applying a voltage proportional to $V_{tr,j}-V_{rot,j}$ across capacitor $C_3$ of axis j,
(c) applying a voltage proportional to $V_{tr,j}+V_{rot,j}$ across capacitor $C_2$ of axis j, and
(d) applying a voltage proportional to $-(V_{tr,j}+V_{rot,j})$ across capacitor $C_4$ of axis j.

3. The accelerometer of claim 2 wherein the test weight is shaped as a cube including the first, second and third sets of faces.

* * * * *